United States Patent [19]

Dvorachek

[11] 4,148,113

[45] Apr. 10, 1979

[54] CLAMP FOR SECURING A PLURALITY OF ELONGATED ARTICLES

[75] Inventor: Harold A. Dvorachek, Iola, Kans.

[73] Assignee: The Echlin Manufacturing Company, Branford, Conn.

[21] Appl. No.: 799,595

[22] Filed: May 23, 1977

[51] Int. Cl.$^2$ ............................................. B65D 63/00
[52] U.S. Cl. ................................ 24/16 R; 24/81 CC; 248/74 PB
[58] Field of Search .......... 24/73 CC, 73 PF, 73 PM, 24/73 PB, 81 R, 81 CC, 83, 16 R, 279; 248/68 R, 74 R, 74 B, 74 PB, 248

[56] References Cited

U.S. PATENT DOCUMENTS

| | | | |
|---|---|---|---|
| 2,799,907 | 7/1957 | Kohtz | 24/81 CC |
| 3,906,592 | 9/1975 | Sakasegawa et al. | 24/81 CC |

FOREIGN PATENT DOCUMENTS 2362931  6/1974  Fed. Rep. of Germany ........ 248/68 R Primary Examiner—Louis K. Rimrodt
Attorney, Agent, or Firm—Neuman, Williams, Anderson & Olson

[57] ABSTRACT

A clamp is provided for securing a plurality of elongated articles in a spaced relationship; the clamp includes a base provided with posts, each including a securing element, which mutually define a recess therebetween to accept articles of a plurality of sizes. In addition, the clamp includes a pair of straps, one end of each being connected to the base and including a securing element on the opposite end; securing elements on each strap and post are each provided with an opening therethrough, which openings are aligned and adapted to accommodate a bolt or the like. The bolt and securing elements cooperate to provide structural support to the clamp.

8 Claims, 4 Drawing Figures

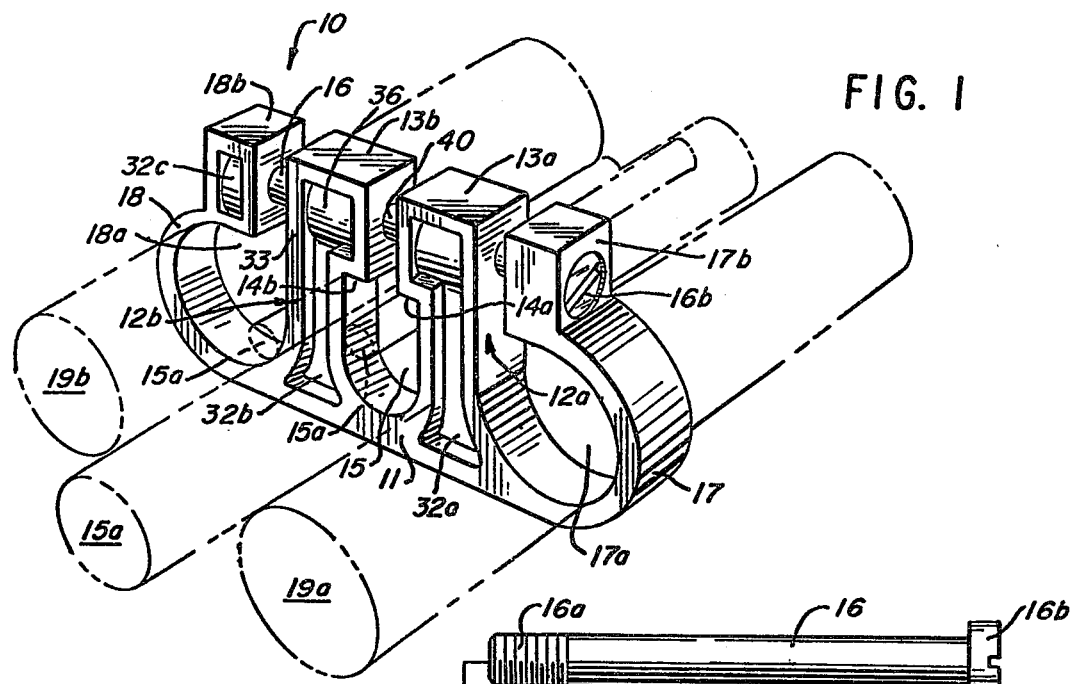
FIG. 1
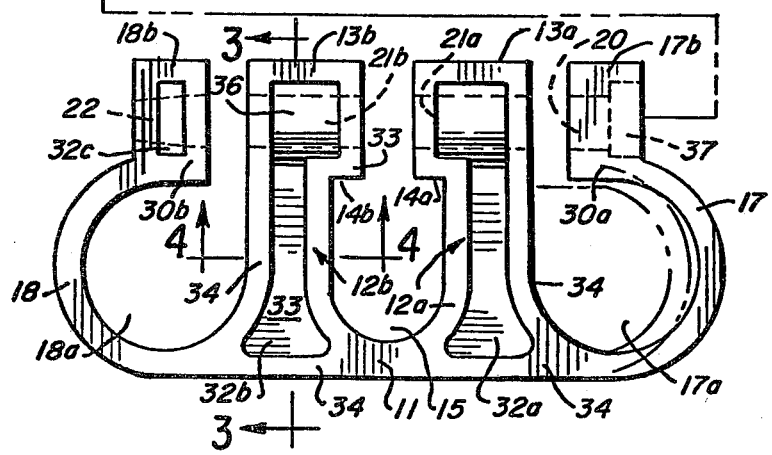
FIG. 2
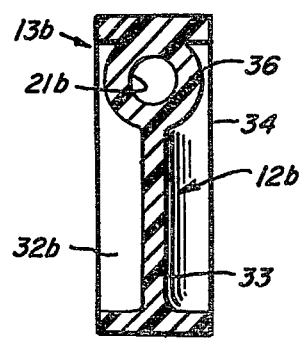
FIG. 3
FIG. 4

CLAMP FOR SECURING A PLURALITY OF ELONGATED ARTICLES

BACKGROUND OF THE INVENTION

This invention relates to clamps, and more particularly clamps of a type employed to hold a plurality of elongated articles in spaced relation.

In a modern tractor-trailer hookup the tractor is not only connected mechanically to the trailer but also electrically and pneumatically. More well electrical wires or cables are provided to conduct electricity from the tractor to the trailer for a variety of purposes, including lighting the trailer; in addition, hoses or tubes associated with the pneumatic braking system of the trailer run between the tractor and the trailer. Generally, to keep these hoses, cables, tubes and wires from becoming entangled or damaged, they may be bundled together or held in a fixed relationship by various known clamping or retaining apparatus. Merely bundling of these articles together without maintaining them in a fixed relationship, however, may not prevent excessive relative motion between adjacent articles and the resulting frictional wear.

Employing clamps with fixed size wells or pockets to maintain the articles in a fixed relationship may be effective to prevent relative motion, but such clamps are not well adapted for use with various sizes of hoses, cables or wires. In addition, the need for employing a plurality of clamps to accommodate all of such hoses, wires and cables, and the possibility that each clamp may include a plurality of components may result in a great multiplicity of parts which may become disassociated, lost or broken.

It may frequently be desirable to hang such clamps, and the articles retained therein, between a tractor and trailer. Such clamps may be provided with a bail-like portion or the like to facilitate the hanging or suspension thereof. When a clamp is suspended from such a portion, the load of accommodated articles should be distributed along the clamp to prevent any resulting deformation of the clamp which would modify the article-carrying wells or recesses and thereby restrict the fluid-flow capabilities of certain accommodated articles. This is particularly true when the clamp is constructed of a flexible material and may be easily adapted to securely accommodate a variety of tube sizes.

Specifically, in the Klimek and Mastis patent application, Ser. No. 660,140, filed 2/23/76, (U.S. Pat. No. 4,024,604), of common assignee, only two-point clamp support through the strap ends thereof is relied upon, with the tubes retained in end wells being subjected to deformation as the clamp load increases. In addition, because the clamp is unsupported between the straps mounted on opposite ends thereof, the overlying strap portion could become separated from the underlying posts, leaving the articles accommodated in part by the posts, unsecured.[1] These disadvantages are overcome by the present invention,[2]

[1] further, positive retention of the cable accommodated in the central well is achieved only by securing the overlying straps in an abutting relation with the accommodated cable,

[2] wherein the upstanding posts are movable to a limited extent toward each other as the clamp is secured to thereby assure possitive retention of the article or articles accommodated therein.

OBJECTS OF THE INVENTION

Accordingly, it is an object of the present invention to provide an improved, low cost, and simplified clamp for supportably retaining or securing hoses or tubes, cables or wires of various sizes.

It is another object of this invention to provide a clamp which securely holds hoses or tubes, cables or wires of different diameters in spaced relation and which can be secured or released quickly.

It is still another object of this invention to provide a clamp of flexible, unitary construction and cable of being suspended without substantially deforming or otherwise restricting the fluid-flow capabilities of the articles retained therein.

SUMMARY OF THE INVENTION

These objects are achieved by a clamp according to the invention which includes a base provided with at least a standard or post; the standard is formed to at least partially define a recess or well suitable for receiving at least one elongated article therein. Connected to opposite ends of the base are straps having at their distal ends securing or locking elements. The straps are bendably adapted to accommodate articles of a variety of dimensions, with the strap securing elements aligned with the corresponding securing element on the distal end of the standard or post. The securing elements are each provided with an opening therein which is adapted to receive a bolt or the like therethrough. The openings in the securing elements are coaxially aligned. When secured through all securing elements, the cooperation between the bolt and the securing elements distributes the clamp load along the clamp.

In one illustrative embodiment of the invention a pair of standards is employed, which defines a recess or well between them. In addition, each of the standards define an additional well or recess with a corresponding one of the straps. A securing element is mounted on each standard and on each strap. An opening is provided in each element and is co-axially aligned with the openings in each of the other securing elements. The openings are adapted to accept a bolt therethrough which secures the clamp and facilitates hanging thereof.

Other objects, advantages and features of the invention will become apparent upon reading the following detailed description and appended claims, and upon reference to the accompanying drawings.

BRIEF DESCRIPTION OF THE DRAWINGS

For a complete understanding of this invention, reference should now be had to the embodiment illustrated in greater detail in the accompanying drawings and described below by way of an example of the invention.

IN THE DRAWINGS

FIG. 1 is a perspective view of the preferred embodiment of a clamp embodying principles of this invention with retained hoses or tubes, wires and a cable shown in phantom, and a bolt shown in position therein.

FIG. 2 is an elevational view of the clamp of FIG. 1, with a bolt shown in exploded relation therefrom.

FIG. 3 is a sectional view of the clamp shown in FIG. 2, taken along line 3—3.

FIG. 4 is a sectional view of the clamp shown in FIG. 2, taken along line 4—4.

While the invention will be described in connection with a preferred embodiment, it will be understood that it is not intended to limit the invention to that particular embodiment. On the contrary, it is intended to cover all alternatives, modifications and equivalents as may be included within the spirit and scope of the invention as defined by the appended claims.

DESCRIPTION OF THE PREFERRED EMBODIMENT

Turning now to the drawings and principally FIG. 1, the preferred embodiment of a clamp according to the invention is shown generally at 10. It is envisioned that the clamp be molded in a single piece and be of a flexible yet durable material, such as nylon. A base 11 of clamp 10 is provided with two uprights, posts, or standards 12a and 12b, each provided with respective securing elements 13a, 13b mounted thereover at distal ends thereof. A "U"-shaped recess or well 15 is formed in base 11 between standards 12a and 12b. Recess 15 is of such a size to accommodate multiple wires or cables 15a of different diameters, shown in phantom in FIG. 1, of a type used to conduct electrical signals between a tractor and a trailer. The securing elements 13a, 13b extend inwardly towards each other beyond posts 12a, 12b and thereby define ledges 14a, 14b, which act to contain the wires and/or cables within recess 15.

Integrally connected to the base 11 and positioned at opposite ends thereof are arcuately-shaped straps 17, 18 and which together with the respective posts 12a and 12b, form respective wells 17a, 18a adapted to accommodate a pair of larger dimension tubes or hoses 19a, 19b. Such tubes or hoses are typically of a type which provide service and supply pressure between a tractor and trailer. It may be noted that the wells or recesses each have a principal axis aligned substantially laterally of the clamp 10 and parallel to each other.

While it is contemplated that articles of various dimensions may be accommodated within the clamp 10, the relative sizes of the wells 15, 17a, 18a should be such that upstanding securing elements 13a, 13b, 17b, 18b mounted on straps 17, 18 and posts 12a, 12b are aligned. In this alignment, a bolt or self-tapping screw 16 may extend through the openings provided in the securing elements as further explained hereinafter, when articles 15a, 19a and 19b are in place, as in FIG. 1.

Referring now to FIG. 2, at the distal end of the strap 17 is an upwardly-extending securing element or boss 17b which is provided with a laterally centered opening or hole 20 therethrough adapted to snugly accommodate bolt 16. Corresponding elements 13a, 13b and 18b at the distal ends of 12a, 12b, and strap 18, respectively, are each provided with a laterally centered bolt-accommodating hole 21a, 21b and 22, in axial alignment with hole 20 in element 17b.

Opening 22 in element 18b is tapered from end-to-end and is adapted to interfere with the passage of threaded screw tip 16a therethrough as the bolt 16 is turned therein. Because the clamp is molded from a flexible material, as the screw tip 16a engages the tapered portion of element 18b it will self-tap and thereby maintain the clamp 10 in a closed position. In conjunction therewith, an enlarged recess 37 is provided in element 17b along one surface thereof and coaxially aligned with opening 20 to accommodate bolt head 16b flush against element 17b when the bolt 16 is in place.

To facilitate placement or removal of the elongated articles in wells 15, 17a, 18a, straps 17, 18 may be manually deflected away from standards 12a, 12b. Once the articles have been placed in the wells 17a, 18a and the manual force removed, the straps 17, 18 will tend to assume their original position. In like fashion, standards 12a, 12b can be manually deflected away from each other to a more limited extent to aid in the positioning of wires and/or cables within recess 15.

To maximize the holding effectiveness and strength of the clamp while utilizing a minimum of material, areas 32a, 32b, 32c defined by a web 33 and flanges 34, forming a substantially I-beam cross-section (see FIGS. 3, 4), are provided centrally of posts 12a, 12b, and elements 13a, 13b and 18b. At the upper end of web 33, a curved post portion 36 is formed and defines the bolt-accommodating opening 21b in element 13b. The curved portion 36 is of substantially the same cross-sectional dimension as web 33 and does not protrude beyond flanges 34 delimiting the periphery of post 12b or element 13b. The flanges 34 extend along the periphery of each standard 12a, 12b and base 11, supplementing the structural integrity of the clamp and providing a wider surface over which the cables, wires or tubes will lie. Each strap 17, 18 is of the same width as flanges 34. Such a reduced cross-sectional area is not included in securing element 17b because of the enlarged recess 37 provided therein.

In use, after the above described articles have been placed within the respective recesses or wells, the straps 17 and 18 are secured in position relative to adjacent posts 12a, 12b by inserting bolt 16 through the openings provided in securing elements 17b, 13a, 13b and 18b, and tapping the bolt 16 into the tapered portion of element 18b. Depending on the size of the tubes accommodated in wells 17a, 18a, straps 17, 18, which are initially formed with their distal ends spaced from the adjacent post, may be drawn into abutting relation with the adjacent post, to assure a positive retention of the article within the well 17a or 18a (see phantom lines in FIG. 2).

*3
*3 in like fashon, securing the bolt 16 in clamp 10 will cause limited angular movement of the posts 12A and 12B to securely accommodate any articles retained in "U"-shaped recess 15.

As in position through the securing elements 17b, 13a, 13b, 18b an exposed portion 40 of bolt 16 between securing elements 13a, 13b (FIG. 1) may serve as a bail-like member to facilitate the suspension, hanging or other mounting of the clamp in a desired location or position. In addition, when the bolt 16 is in place through the openings in elements 17b, 13a, 13b, 18b, the structural integrity of the clamp will be augmented.

Specifically, since the straps 17, 18 and the posts 12a, 12b are positively anchored to bolt 16 via respective securing elements, deformation of any portion of the clamp will be prevented. Thus, because of the clamp structure, bolt 16 will serve multiple purposes when in place. In addition to augmenting the beam strength along the clamp, the bolt will hold the clamp in a "closed" position, and function as a bail-like member 40 from which the clamp can be suspended. When suspended, then, the straps 17, 18 and posts 12a, 12b will cooperate with bolt 16 to support the clamp load at four, spaced, locations.

Thus, a clamp is provided that is of a unitary and flexible construction, and is inexpensive to manufacture; yet the clamp is capable of securely maintaining a plurality of hoses or tubes, cables or wires in a fixed spaced relationship. While a particular embodiment of the invention has been shown, it will be understood, of course, that the invention is not limited thereto since modifications may be made and other embodiments of the principles of this invention will occur to those skilled in the art to which the invention pertains upon considering the foregoing teachings. For example, it is apparent that a clamp according to this invention may be employed to maintain in spaced relationship a plurality of hoses or tubes of various sides, a plurality of cables or wires of various sizes or a combination, as shown herein, of hoses or tubes, cables and wires. It is, therefore, contemplated by the appended claims to cover any such modification and other embodiments as incorporate those features which constitute the essential features of this invention within the true spirit and scope of the following claims.

I claim:

1. A clamp for retaining a plurality of elongated articles in spaced relation, comprising: a base member; post means extending from said base member to at least partially define a plurality of article-accommodating wells; first strap means mounted on said base member and defining with said post means a first of said article-accommodating wells; second strap means mounted on said base member and defining with said post means a second of said article-accommodating wells; a first securing means mounted on said post means, and second and third securing means mounted respectively on said first and second strap means, said first securing means including a central opening therethrough; bolt means for securably engaging said second securing means and extending through said central opening of said first securing means to securably engage said third securing means, wherein said bolt means extends along an axis transverse of such elongated articles and laterally displaced substantially equally from said wells and said wells are all on the same side of said bolt means.

2. The clamp of claim 1, wherein said post means comprises first and second post elements defining a third article-accommodating 23ll therebetween and said first securing means comprises first and second securing elements, mounted respectively on the distal ends of said first and second post elements.

3. The clamp of claim 2, wherein said securing elements on said post elements extend from respective of said post elements toward each other thereby forming flanges respectively extending inwardly of said third article-accommodating well defined between said first and second post elements.

4. The clamp of claim 1, wherein said first and second strap means are integrally joined to said base member and said second and third securing means are mounted to said first and second strap means respectively, at the distal ends thereof.

5. The clamp of claim 1, wherein said first, second and third securing means are integrally joined to said post means and said first and second strap means at the respective distal ends thereof.

6. The clamp of claim 1, wherein said third securing means includes a portion having integrally formed therein means to retain one end of said bolt means such that said bolt means is securely held therein when said bolt means engages said third securing means.

7. The clamp of claim 6, wherein said portion of said third securing means comprises a substantially tapered passage therethrough and said bolt means comprises a self tapping portion thereof adapted for forming threads within said portion of said third securing means when said bolt means engages said portion of said third securing means.

8. A clamp for retaining a plurality of elongated articles in spaced relation comprising a base member; first and second parallel posts extending upwardly from and substantially perpendicular to said base member to at least partially define three wells; first flexible strap means integrally joined to said base member and defining with said first post a first of said wells; second flexible strap means mounted on said base member and defining with said second post a second of said wells; said posts defining a third of said wells therebetween; first and second securing means mounted integrally to the respective distal ends of said posts and third and fourth securing means mounted integrally to the respective distal ends of said first and second strap means, said first and second securing means extending laterally inwardly from said posts to form flange members at one end of said third well defined between said posts and said first and second securing means each having a portion including an opening extending centrally therethrough to slidably accommodate an at least partially threaded bolt, and said third and fourth securing means respectively including means to cooperatively operate with said bolt, including said threads thereof, to hold said bolt securely when said bolt is positioned through said opening of each of said first and second securing means, such that said bolt extends transversely of such elongated articles as may be placed in said wells.

* * * * *

UNITED STATES PATENT AND TRADEMARK OFFICE
CERTIFICATE OF CORRECTION

PATENT NO. : 4,148,113
DATED : April 10, 1979
INVENTOR(S) : Harold A. Dvorachek

It is certified that error appears in the above-identified patent and that said Letters Patent are hereby corrected as shown below:

Col. 1, line 11    Change "well" to -- specifically --.

Col. 2, line 8     Change "cable" to -- capable --.

Col. 5, line 34    Change "2311" to -- well --.
  Claim 2

Signed and Sealed this

Sixteenth Day of October 1979

[SEAL]

Attest:

RUTH C. MASON
Attesting Officer

LUTRELLE F. PARKER
Acting Commissioner of Patents and Trademarks